UNITED STATES PATENT OFFICE.

ANDREW J. ROWLAND, OF CINCINNATI, OHIO, ASSIGNOR TO THE FEDERAL PRODUCTS COMPANY, OF CINCINNATI, OHIO, A CORPORATION OF OHIO.

COATING AND IMPREGNATING AGENT AND THE PROCESS OF MAKING IT.

1,393,833. Specification of Letters Patent. Patented Oct. 18, 1921.

No Drawing. Application filed October 6, 1920. Serial No. 415,125.

*To all whom it may concern:*

Be it known that I, ANDREW J. ROWLAND, a citizen of the United States, residing at Cincinnati, in the county of Hamilton and State of Ohio, have invented a certain new and useful Coating and Impregnating Agent and the Process of Making It, of which the following is a specification.

My invention relates to a novel coating and impregnating agent for fiber and other containers and surfaces, and to the process of making said agent.

The object of my invention is to provide a waterproof coating or impregnating agent for containers or other surfaces that will be economical to manufacture, of light color, free from objectionable odors, possessing a fair degree of pliability, and that will not impart any poisonous ingredients to any edible product with which it comes in contact.

My invention consists in the product and in the process of making same, as herein set forth and claimed.

My process consists in heating aluminum oleate $Al(C_{17}H_{33}.COO)_3$ to a temperature of about 270° F. and blowing air therethrough for from three to four hours or until the product, upon cooling, becomes pliable and elastic, or assumes a rubberlike consistency, then heating the product to about 320° F. and blowing steam therethrough for about two hours for the purpose of deodorizing the same. This deodorizing is preferably performed under a vacuum of about twenty to twenty-five inches, but it may, if desired, be steam-blown at atmospheric pressure.

The product is then allowed to cool to a temperature of about 200° F. when it is dissolved, preferably by the addition of 80% to 97% of benzol or other suitable solvent, such as gasolene, alcohol and naphtha. The mixture is agitated until it reaches a uniform consistency. After introducing the solvent and allowing the product to cool, it is then ready for use and may be applied to the container or other surface by brush, spraying, dipping or any other method desired. My invention also consists in the product when produced. A paper, pulp or fiber container coated or impregnated with said agent forms a very satisfactory receptacle for milk, milk products, cheese, ice cream, syrups, powders, dry food-stuffs and the like.

The product while being aerated is so agitated as to subject the entire mass to the action of the air, whereby it is polymerized, thus producing a product that is elastic and pliable.

When it is desired to impregnate or coat the surface of the container for use as a receptacle for salt, soap powders, washing powders or other products not requiring an odorless water-proof coating, the aluminum or other metallic oleate may be dissolved in benzol or other solvent without aeration or steam treatment and when thus produced may be applied in the same manner as above set forth.

My invention is capable of some modification without departure from its scope or spirit, as, for instance, while I have specified the use of aluminum oleate as the ingredient to be treated, copper oleate may be used with fairly good results and any other metallic oleate, except sodium oleate and potassium oleate, may likewise be employed.

Having described my invention, what I claim as new and desire to secure by Letters Patent, is:

1. The process of making a coating and impregnating agent which comprises in heating metallic oleate, blowing air therethrough until the product, on cooling, becomes pliable and elastic, then increasing the temperature thereof and blowing steam therethrough until the produce is deodorized.

2. The process of making a coating and impregnating agent which consists in heating aluminum oleate to a temperature of about 270° F., then blowing air therethrough at said temperature until the product becomes pliable and elastic, then heating said product to about 320° F. and blowing steam therethrough for about two hours to deodorize the same, then reducing the temperature to about 200° F. and while at the reduced temperature adding a solvent.

3. The process of making a coating and impregnating agent which comprises in heating aluminum oleate, blowing air therethrough until the product, on cooling, becomes pliable and elastic, then increasing the temperature thereof and blowing steam therethrough until the product becomes deodorized.

4. The process of making a coating and impregnating agent which consists in heating metallic oleate, blowing air therethrough until the product becomes pliable and elastic, then increasing the temperature of said product and blowing steam therethrough until the product is deodorized, then reducing the temperature and while at the reduced temperature adding a solvent.

5. The process of making a coating and impregnating agent which comprises in heating metallic oleate and then blowing air therethrough until the product, on cooling, becomes pliable and elastic.

6. The process of making a coating and impregnating agent which comprises in heating aluminum oleate and then blowing air therethrough until the product, on cooling, becomes pliable and elastic.

7. The process of making a coating and impregnating agent which consists in heating metallic oleate and then aerating and agitating the same until the product, on cooling, becomes pliable and elastic.

8. The process of making a coating and impregnating agent which consists in heating metallic oleate to a temperature of about 320° F., then blowing air therethrough, then blowing steam therethrough until the product is deodorized, then reducing the temperature and while at a reduced temperature adding a solvent.

9. The process of making a coating and impregnating agent which consists in heating aluminum oleate to a temperature of about 320° F., then blowing air therethrough, then blowing steam therethrough until the product is deodorized, then reducing the temperature and while at a reduced temperature adding a solvent.

10. The process of making a coating and impregnating agent which consists in heating metallic oleate until it melts, then blowing air therethrough, then blowing steam therethrough until the product is deodorized and then reducing the temperature and while at a reduced temperature adding a solvent.

11. The process of making a coating and impregnating agent which consists in heating aluminum oleate until it melts, then blowing air therethrough, then blowing steam therethrough until the product is deodorized and then reducing the temperature and while at a reduced temperature adding a solvent.

12. The process of making a coating and impregnating agent which consists in heating metallic oleate until it melts, then blowing air therethrough, and then reducing the temperature, and then adding a solvent at the reduced temperature.

13. The herein described product consisting of a polymerized metallic oleate of pliable and rubberlike consistency.

14. A polymerized aluminum oleate of pliable and rubberlike consistency.

ANDREW J. ROWLAND.

Witnesses:
JAMES N. RAMSEY,
IRENE OGDEN.